United States Patent

[11] 3,584,541

[72] Inventor Gail M. Cunningham
 Saginaw, Mich.
[21] Appl. No. 836,239
[22] Filed June 25, 1969
[45] Patented June 15, 1971
[73] Assignee General Motors Corporation
 Detroit, Mich.

[54] LIFT CYLINDER ASSEMBLY
 4 Claims, 7 Drawing Figs.
[52] U.S. Cl. ............................................... 91/468,
  92/30, 92/168
[51] Int. Cl. ...................................... F15b 11/08,
  F15b 13/04
[50] Field of Search .......................................... 92/23, 30,
  165, 132, 168; 91/432, 443, 468; 137/513.5

[56] References Cited
UNITED STATES PATENTS

| | | | |
|---|---|---|---|
| 1,100,761 | 6/1914 | Mueller et al. | 137/513.5 |
| 3,010,435 | 11/1961 | Abrams | 91/443 |
| 3,166,990 | 1/1965 | Hoffman | 92/168 |
| 3,490,341 | 1/1970 | Sessody | 92/132 |

*Primary Examiner*—Houston S. Bell, Jr.
*Attorneys*—Frank J. Soucek and Charles R. Engle ABSTRACT: A lift cylinder assembly including a cylinder having a closed end and telescopically receiving an elongated piston having an axial passage therethrough. The cylinder comprises three serially arranged annular grooves in its inner surface, the outermost groove being located adjacent its open end. The outermost groove receives a scraper and wiper assembly, the intermediate groove receives a fluid seal assembly, and the most inwardly groove receives a locking ring engaging a mating annular groove on the outer surface of the piston locking it in a furthermost extended position. One of these mating locking grooves includes a camming ramp which upon the application of a sufficient force cams the locking ring out of engagement with the member possessing the camming ramp so that the piston may be retracted. Pressure fluid is supplied to the interior of the piston through a check valve located in the axial passage. The check valve controls flow into the piston so that fluid accumulates between the end of the piston and the cylinder closed end extending the piston in a regulated fashion. The check valve includes a valve seat member having a plurality of radially extending passages metering flow in a reverse direction so that retraction of the piston is also regulated.

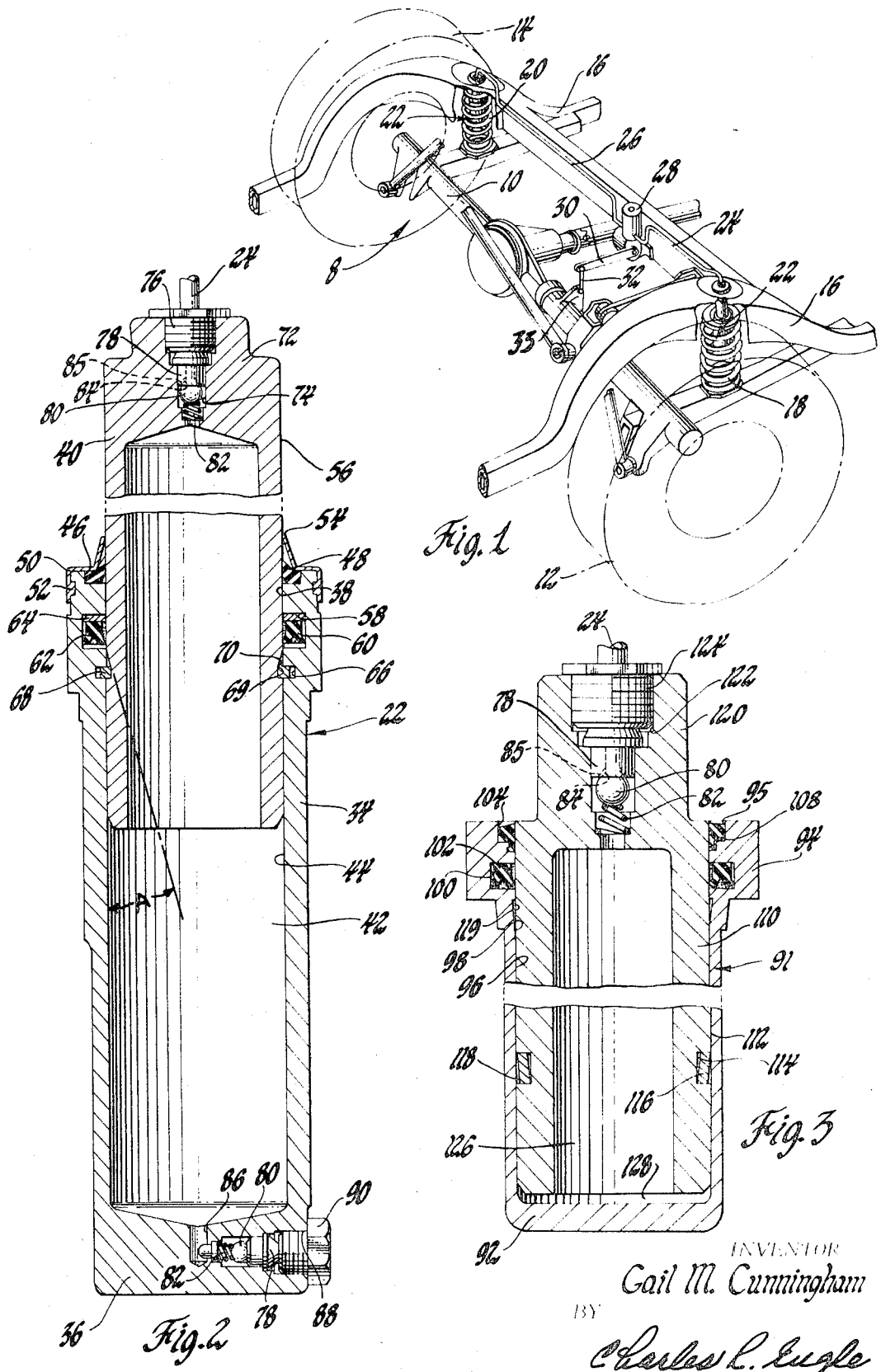

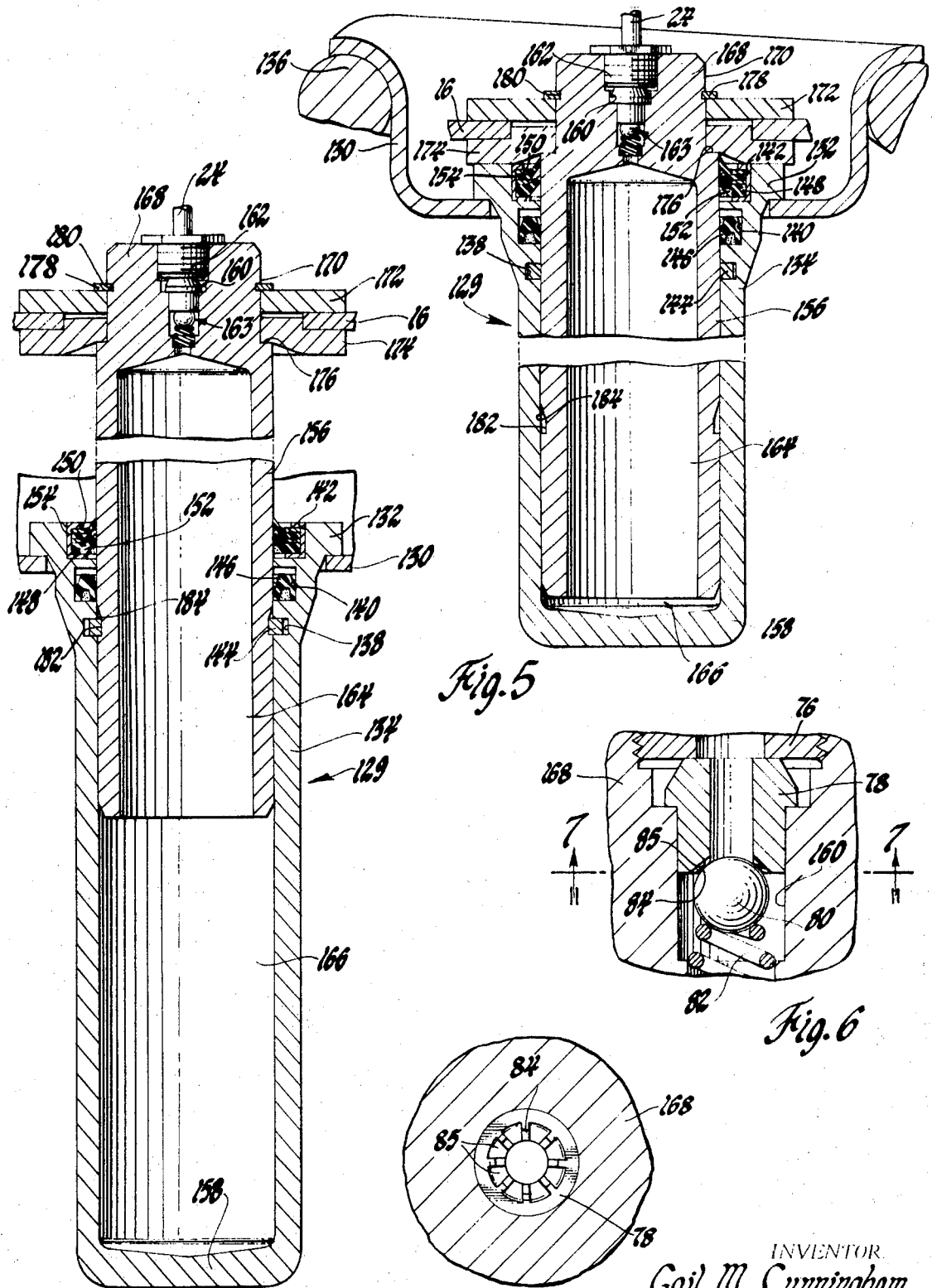

LIFT CYLINDER ASSEMBLY

This invention relates to a lift cylinder assembly and more specifically to such an assembly wherein a single conduit is utilized to accommodate flow in both directions extending and retracting a piston within a cylinder containing serially arranged scraper, seal, and locking ring assemblies.

The lift cylinder assembly which is the subject of this invention is described in a vehicle-leveling system to illustrate one operative environment of the assembly wherein representative problems and advantages are readily apparent. Vehicle-leveling systems presently use various configurations of air springs and hydraulic cylinders operating in conjunction with steel, coil, or leaf springs to maintain a constant suspension height in response to vehicle load variations. Frequently these structures involve assemblies including numerous precisely machined components and usually require a complicated pressure fluid plumbing system. One difficulty encountered with these presently used systems is that the entrance of a slight amount of foreign matter into the areas of low tolerance may result in binding of the mating parts. It is therefore a purpose of this invention to provide a relative simple lift cylinder assembly incorporating reliable means to prevent the entrance of foreign matter into areas of close tolerance. It is also a purpose of this invention to provide a lift cylinder assembly utilizing a single dual flow line connected between the cylinder assembly and a fluid pump and height control valve assembly, the latter both supplying and receiving fluid flowing therethrough. These purposes are accomplished by providing a surface scraper assembly near the open end of a sleeve-type cylinder, an intermediate positioned seal assembly, and a locking ring disposed serially inward of the scraper assembly whereby each of these elements respectively engage the outer surface of the piston during reciprocating movement thereof. The locking ring, by engaging an annular piston groove, prevents separation of the piston from the cylinder and locks the piston in an extended position.

A first object of this invention is the provision of an improved lift cylinder assembly utilizing a single pressure fluid conduit accommodating flow in two directions allowing extension and retraction of the cylinder assembly.

Another object of this invention is the provision of a lift cylinder assembly including means for locking the piston in an extended position while allowing the piston to be subsequently retracted.

A further object of this invention is the provision of an improved lift cylinder assembly having a check valve assembly mounted in either the cylinder or the piston in a pressure fluid supply conduit therein whereby the check valve regulates flow into the assembly, the valve being biased against a valve seat including a plurality of slots allowing reverse flow around the valve providing for retraction of the piston in a regulated fashion.

Another object of this invention is the provision of a lift cylinder assembly including a scraper assembly, a seal assembly, and a locking ring arranged serially inwardly in the cylinder inner surface preventing entrance of foreign matter into the cylinder and the exit of pressure fluid from the cylinder while positively locking the piston in a furthermost extended position.

Yet another object of this invention is the provision of an improved lift cylinder assembly for use in a vehicle-leveling system wherein the cylinder exterior is formed to slidably receive an adapter matingly engaging a terminal coil of a vehicle spring and the piston includes means for readily clamping it to a portion of the vehicle frame so that movement of the piston regulates vehicle height between the sprung and unsprung masses as vehicle load changes.

A still further object of this invention is the provision of an improved lift cylinder assembly wherein a sleeve-type cylinder contains an annular groove in its inner surface receiving an expanded split locking ring continually contracting against the outer surface of a piston and lock the same in place when it engages a mating annular groove in the piston.

Another object of this invention is the provision of an improved lift cylinder assembly wherein the outer surface of the piston contains an annular groove receiving a conical-shaped locking ring under compression and continually expanding against the inner surface of the cylinder and engaging a locking groove formed therein when the piston is extended a sufficient degree.

A still further object of this invention is the provision of an improved lift cylinder assembly containing mating locking grooves in the outer surface of the piston and the inner surface of the cylinder wherein one of the grooves includes an angular extending ramp camming surface providing an approximate 15 angle with the outer surface of the piston whereby a locking ring radially movable in the grooves is cammed from one of the grooves so that the piston may be retracted when a sufficient force is applied.

FIG. 1 is a perspective view of a portion of a vehicle rear suspension system illustrating one application of the subject lift cylinder assembly.

FIG. 2 is a sectional elevational view of a preferred embodiment of the lift cylinder assembly utilized in the suspension system illustrated in FIG. 1.

FIG. 3 is an elevational view in section illustrating a modification of the lift cylinder assembly including a conically shaped locking ring mounted in the piston.

FIG. 4 is an elevational view in section illustrating a modification of the lift cylinder assembly with the piston extended and further including means for fastening the piston t the sprung mass and the cylinder to the unsprung vehicle mass.

FIG. 5 is an elevational view in section of the lift cylinder assembly shown in FIG. 4 with the piston in a retracted position.

FIG. 6 is an enlarged fragmentary sectional view of a check valve assembly utilized in the subject lift cylinder assembly illustrating a ball valve being biased into engagement with a bushing valve seat containing a plurality of slots providing for regulated flow around the ball valve in a reverse direction.

FIG. 7 is a fragmentary view of the bushing valve seat member taken on lines 7-7 of FIG. 6.

Referring now to the drawings, FIG. 1 illustrates a fragmentary portion of a rear vehicle suspension system including a leveling system incorporating the lift cylinder assembly of the subject invention. More specifically, the unsprung mass 8 includes a rear axle housing 10 which contains an axle rotatably supporting wheels and 14. The vehicle sprung mass, including frame 16, is supported upon the unsprung mass 8 through a suspension system including coil springs 18 and 20 which have concentrically disposed therein lift cylinders 22 that are in fluid communication through lines 24 and 26 with a fluid reservoir pump and height control valve assembly 28. The fluid reservoir pump and control valve assembly is of the type shown in application Ser. No. 763,834 Scott et al., filed Sept. 30, 1968, entitled "Suspension Actuated Vehicle Leveling System" assigned to the assignee of the present invention. The pump and control valve assembly 28 includes a pivoted arm 30 which is connected by a link 32 to a bracket 33 on the rear axle housing 10. Since the pump and control valve unit 28 is mounted upon the frame 16, the lever 30 pivots in response to variations in height changes between the axle housing 10 and the frame 16.

A preferred embodiment of the lift cylinder assembly 22 is illustrated in FIG. 2. The lift cylinder assembly 22 includes a cylinder 34 having a closed end 36 and an open end 38 telescopically receiving a piston 40 within chamber 42 defined by the interior cylinder surface 44 and closed end 36. The cylinder 34 is formed to contain a first annular groove 46 adjacent open end 38 receiving an elastomeric wiper member 48 retained by a frustoconical stainless steel scraper member 50 secured to the outer surface of the cylinder by gripping prongs 52. The stainless steel scraper 50 terminates in an annular edge 54 which lightly engages outer surface 56 of the piston 40 or is slightly radially loose relative to surface 56 so that it removes a majority of the foreign particles thereon prior to entrance of the piston 40 within chamber 42. A second annular groove 58 is formed in the inner surface 44 of cylinder 34 and receives a seal assembly 60 including a lip seal 62 in engagement with a backup plate 64, the latter preventing distortion of the lip seal during application of pressure fluid thereagainst. A third groove 66 formed in the inner surface 44 of cylinder 34 radially slidably receives a locking ring 68. The split locking ring 68 is formed of spring steel and is expanded upon surface 56 to continually contract against outer surface 56 of the piston 40. A piston groove 69 terminates in a ramp surface 70 extending toward closed end 72 of the piston 40 and presenting an approximate 15° angle A between the ramp surface 70 and the outer surface 56 of the piston 40.

Closed end 72 contains an axially extending stepped bore 74 threadably receiving a conduit coupling 76 securing one of the conduits 24 or 26 to the piston 40. The axial bore 74 contains a flanged bushing valve seat 78 partially receiving a ball valve 80 biased by a spring 82. The ball valve 80 seats against a concave surface 84 of bushing 78 normally substantially closing the axial passage therethrough. Radially extending grooves 85 are coined in surface 84 of bushing 78 so that a controlled amount of reverse flow can take place while ball 80 is seated against the bushing for a purpose later to be described.

A passage 86, formed in the closed end 36 of the cylinder 34, connects with a laterally extending stepped bore 88 threadably receiving a cap member 90 preventing leakage of fluid from closed end 36. A second ball valve 80 is biased by spring 82 against a flanged valve seat member 78 in the same fashion as the ball valve arrangement in the closed end 72 of piston 40. Incorporation of the ball valve assembly in the cylinder closed end 36 provides for connection of lines 24 or 26 to either the cylinder or the piston depending upon the particular installation environment of the lift cylinder assembly 22. When the pressure fluid is supplied through stepped bore 88, the bore 74 being capped, it is obvious that the piston 40 could be of solid construction and still function as desired.

With reference now to FIG. 3, a modified lift cylinder assembly includes a cylinder 91 having a closed end 92 and an annular flange 94 adjacent open end 95. The cylinder 91 is a sleeve-type cylinder including an inner surface 96 containing a first conically shaped annular groove 98 formed therein at a predetermined distance inwardly of open end 95. A second annular groove 100 is formed in the cylinder inner surface 96 toward open end 95 from groove 98 and fixedly receives a seal assembly 102. A third annular groove 104, receiving a plastic annular scraper member 108, is formed adjacent end 95 in the inner surface 96 of cylinder 91.

A piston 110, telescopically received within cylinder 91, includes an outer surface 112 which slidably engages inner surface 96 of cylinder 91. The piston 110 contains an annular face 114 formed at a predetermined position in outer surface 112. A frustoconical split spring steel locking ring 116 is radially slidably disposed in the groove 114 and comprises an outer ramp surface 118 having an angle equal to that of surface 119 in locking groove 98. The piston 110 has a closed end 120 containing an axially extending stepped bore 122 receiving a bushing valve seat member 78. Ball valve 80 is also placed in stepped bore 122 and is continually biased by spring 82 toward seat surface 84 of the bushing 78. The surface 84 is coined to contain a plurality of radially extending grooves 85 allowing a regulated flow in a reverse direction through fluid supply line 24 during retraction of the piston 110. The stepped bore 122 threadably receives coupling member 124 connecting conduit 24 to the lift cylinder assembly supplying pressure fluid to piston chamber 126 for subsequent accumulation in chamber 128 between cylinder closed end 92 and the piston 110. The split spring steel locking ring 116 is normally contracted within annular piston groove 114 so that it continually expands against inner cylinder surface 96 and when moved into alignment will spring outwardly into annular groove 98.

Further modified lift cylinder assemblies are illustrated in FIGS. 4 and 5. In these figures the lift cylinder assembly 129 slidably receives a cup-shaped mounting bracket 130 which engages an annular flange 132 adjacent the open end of cylinder 134. The mounting bracket 130 is formed to seat upon an end coil 136 of one of the coil springs 18 or 20 illustrated in FIG. 1. The cylinder 134, in its inner surface, contains a first annular groove 138, a second annular groove 140, and a third annular groove 142 adjacent the cylinder open end. These grooves respectively receive a spring steel split locking ring 144, a seal assembly 146, and a scraper and wiper assembly 148 including a metallic scraper member 150 and an elastomeric wiper member 152, both being retained within an annular mounting ring 154 secured in the groove 142.

As in the previous described structures, piston 156 is telescopically disposed within the cylinder 134 for reciprocation toward and away from cylinder closed end 158. The piston 156 likewise contains an axially extending line 24 thereto. A check valve assembly 163 is located within stepped bore 160 and controls fluid flow from conduit 24 into chamber 164 in the piston 156 as well as into chamber 166 in the cylinder 134. The check valve assembly 163 is identical to that utilized in the previously described lift cylinder embodiments. Closed end 168 of piston 156 has a surface 170 of reduced diameter slidably receiving mounting plates 172 and 174, the latter engaging a shoulder 176 on the piston 156 after portion 170 has been inserted in a mounting aperture. The mounting plates 174 and 176 fit on opposite sides and engage a portion of a vehicle frame member 16 shown in FIG. 1. The plates 174 and 176 are slidably retained upon surface 170 by means of a spring locking ring 178 fitting within a retaining groove 180.

The piston 156 is shown in its furthermost extended position in FIG. 4 with the locking ring 144 being radially movable in annular groove 138 and contracting into annular groove 182 in the outer surface of piston 156, the annular groove 182 terminating in an outwardly extending cam surface 184. The ring 144 has a thickness sufficient to remain in engagement with surfaces of both the cylinder and piston to prevent further outward piston movement. A retracting force on the piston engages the cam surface 184 with ring 144 biasing it outwardly into groove 138 freeing the piston for retraction within the cylinder. The piston 156 is shown in its furthermost retracted position in FIG. 5.

The ball check valve assembly 163, illustrated in FIGS. 4 and 5, is magnified in FIG. 6 wherein the bushing 78 is positioned in the stepped bore 160 and ball valve 80 is biased against the surface 84 by spring 82. The end surface 84 is coined to include a plurality of radially extending grooves 85 best shown in the fragmentary view of FIG. 7. The grooves 85 meter flow in a reverse direction through the stepped bore 160 into conduit 24 during retracting movement of the piston 156.

In operation the lift cylinder assembly 22 is connected to a single conduit 24 or 26. In the particular environment illustrated in FIG. 1, a pair of lift cylinders 22 are employed in conjunction with the fluid reservoir pump and control valve assembly 28 to maintain a constant height between vehicle sprung and unsprung masses 16 and 10 regardless of vehicle load. The conduits 24 and 26 connecting the pump assembly 28 with the respective lift cylinders 22 and conducting fluid in both directions as regulation of the vehicle height is demanded by the pump and control assembly 28. When it becomes necessary to extend piston 56 relative to cylinder 34 thereby raising sprung mass 16 relative to the axle housing 10, the conduit 24 receives pressure fluid from the pump assembly 28 moving ball valve 80 away from bushing seat member 78. The pressure fluid then passes through the piston 56 into the cylinder 34 adjacent closed end 36 where it accumulates and forces the piston 56 in an extended direction until the desired vehicle height is obtained. Extension of the piston 56 is limited by engagement of locking ring 68 within the locking groove 69. When the vehicle load decreases and the springs 18 and 20 raise the sprung mass 16 above a predetermined desired height, lever 30 actuates the pump and control valve assembly 28 exhausting pressure fluid into a reservoir contained within the assembly retracting the piston 40 within cylinder 34. Initial retraction of the piston causes ramp surface 70 to cam locking ring 68 out of the piston groove 69 into the cylinder groove 66. During the retracting movement of the piston 40, scraper edge 54 lightly engages outer surface 56 removing any foreign particles that may have collected prior to entrance of surface 56 within cylinder 34. The elastomeric wiper member 48 removes whatever residue material may be present upon surface 56 subsequent to its being engaged by the scraper 50. Fluid seal 62, is biased against the surface 56 to prevent discharge of pressure fluid from cylinder 34.

As illustrated in FIG. 2, the pressure fluid from conduit 24 can be connected to closed end 36 of piston 34 for supplying pressure fluid through conduit 86 into the cylinder. In this situation the cap 90 is secured in axial stepped bore 74 of piston 40.

All of the modifications illustrated in the drawings operate in a like manner regardless of the shape of the locking ring and the cam surface whereupon the piston is positively locked in a predetermined extended position thereby limiting movement in the one direction. A cam surface is provided in either a piston or cylinder groove moving the split ring out of a locking position during retraction of the piston. Of course, it is apparent that a sleeve-type piston of various lengths can be telescopically disposed within a mating sleeve-type cylinder and that a solid piston can be utilized when the pressure fluid is supplied to the cylinder closed end. Also, it is apparent a piston of relatively solid construction containing a longitudinal passage sufficient to conduct pressure fluid discharging from the ball valve 80 into the cylinder would be operative. The rate of extension of the piston from within the cylinder is dependent upon the size of ball valve 80 and the passage in valve seat bushing 78, while the rate of retraction depends upon the size of the coined grooves 85 providing fluid flow in a reverse direction. The subject lift cylinder assemblies as described above are basically designed to be subjected to fluid pressures in the range of 500 to 1,500 p.s.i. and are normally configured to provide a 3- to 4-inch operative stroke of the piston.

From the above description it is apparent that this invention contemplates an improved lift cylinder assembly incorporating a locking arrangement preventing extension of the piston from without the cylinder while also including serially aligned fluid seals and scraper assemblies to provide an advantageous combination. It is obvious that many modifications of the subject lift cylinder assemblies can be utilized and therefore the above description is not intended to limit the scope of this invention.

I claim:

1. A lift cylinder assembly comprising a cylinder having an open end and a closed end, a piston telescopically received in said cylinder, said piston containing an axial passage, an annular groove formed in the outer surface of said piston, a first annular groove formed in said cylinder adjacent its open end, a scraper member mounted in said first groove, said scraper member being continually biased into engagement with the outer surface of said piston, a second annular groove formed in the inner surface of said cylinder inwardly of said first groove, a seal assembly secured in said second groove, a third annular groove formed in the inner surface of said cylinder inwardly of said second groove, all three of said grooves being serially positioned toward the open end of said cylinder, a split spring steel locking ring radially slidable in both said third annular groove and said piston groove when said piston is sufficiently extended aligning said grooves thereby locking said piston in a predetermined extended position, and a cam surface in one side only of one of said aligned grooves independently moving said ring radially outwardly into said third groove out of its locking position during retracting movement of said piston while simultaneously said scraper assembly removes foreign particles from the exterior surface of said piston prior to its entrance within the cylinder and said seal prevents discharge of pressure fluid through the open end of said cylinder.

2. A lift cylinder assembly comprising a sleeve-type cylinder having a closed end and an open end, a sleeve-type piston having a closed end and an open end, the open end of said piston being telescopically received within the cylinder open end for extension and retraction therein, a first annular groove formed in the inner surface of said cylinder adjacent its open end, an elastomeric wiper member disposed within said first annular groove and positioned to resiliently engage the outer surface of said piston, a frustoconical cap member secured to the outer surface of said cylinder and including an annular scraper edge at the smaller portion of the frustum of the cone lightly biased into engagement with the outer surface of the piston, said scraper edge removing foreign particles from the piston outer surface during retracting movement thereof, a second annular groove formed in the inner surface of said cylinder inwardly of said first annular groove but toward said cylinder open end, a seal assembly secured in said second annular groove fluid tightly sealing the mating inner cylinder surface and the outer piston surface, a third annular groove formed in the inner surface of said cylinder in serial arrangement with said first and second grooves, a spring steel split locking ring disposed for radial movement in said third annular groove, an annular groove formed in the outer surface of said piston, a cam surface extending from said annular groove in said piston toward the closed end of said piston and presenting a 15° angle with the outer piston surface thereof, said piston closed end containing an axially extending stepped bore, a fluid supply conduit threadably connected in said stepped bore, a bushing ball valve seat member secured in said bore, a ball valve member, a spring biasing said ball valve member against one end surface of said bushing valve seat member, said one end surface of said valve seat member containing a plurality of radially extending grooves therein, said supply conduit conducting pressure fluid to unseat said ball member and supply fluid through said piston to said cylinder closed end whereby sufficient accumulation of fluid extends said piston until said locking ring engages the annular groove in said piston and retraction of said piston moving said cam surface against said locking ring moving it out of locking engagement with said piston allowing said piston to continue in a retracting direction while the fluid in said cylinder is forced upwardly through said piston and through the coined grooves in said valve seat member regulating the retraction of said piston.

3. A lift cylinder assembly comprising a sleeve-type cylinder having a closed end and an open end, a sleeve-type piston having a closed end and an open end, said piston being telescopically received within said cylinder open end and movable toward and away from said cylinder closed end, a first groove machined in the inner surface of said cylinder adjacent its open end, a plastic scraper assembly retained in said first annular groove in constant engagement with the outer surface of said piston, a second annular groove formed in the inner surface of said cylinder, a seal assembly secured in said second annular groove preventing the discharge of pressure fluid through the open end of said cylinder, a third annular conically shaped groove formed in the inner surface of said cylinder at a predetermined location therein, an annular groove formed on the outer surface of said piston at a predetermined location thereon, a frustoconical split spring steel locking ring disposed in said annular piston groove compressed therein to continuously exert an outward force against the inner surface of said cylinder, a fluid passage in said piston closed end, a valve seat member located in said passage, and a ball valve spring biased into continual engagement with one end of said valve seat member, said one end of said valve seat member including a plurality of radially extending coined grooves, pressure fluid flowing into said fluid passage unseating said ball valve and passing into said cylinder adjacent the closed cylinder end for accumulation sufficient to extend said piston until said locking ring engages said third annular groove retaining the piston in its furthermost extended position, said conically shaped locking ring and said conical annular groove comprising mating cam surfaces which upon the application of a sufficient retracting force moves the locking ring into the piston annular groove and said piston is retracted at a rate controlled by fluid flow through the coined grooves in said one end of said valve seat member.

4. A lift cylinder assembly comprising a sleeve-type cylinder having a closed end and an open end, a sleeve-type piston having a closed end and an open end, the piston open end being telescopically received within the cylinder open end for extension and retraction toward and away from the cylinder closed end, the open piston end and the cylinder closed end forming a fluid chamber therebetween, the piston closed end containing an axial passage therethrough, a ball check valve positioned in said axial passage, a valve seat member secured in said passage, said ball valve being spring biased against one surface of said valve seat, said one surface of the valve seat containing a plurality of radially extending passages, a supply line connected to said piston closed end supplying pressure fluid into said axial passage, said ball valve being moved away from said valve seat by said pressure fluid flowing into said sleeve-type piston, sufficient accumulation of pressure fluid in said fluid chamber extending said piston out of said cylinder, said piston containing an annular groove in the outer surface thereof, a first annular groove formed in the inner surface of said cylinder adjacent its open end, a scraper assembly positioned in said first annular groove engaging the outer surface of said piston, a second annular groove formed in the inner surface of said cylinder inwardly of said first annular groove, a fluid seal assembly secured in said second annular groove, said seal assembly fluid tightly engaging the outer surface of said piston, a third annular groove formed in the inner surface of said cylinder inwardly of said second annular groove, a split spring steel locking ring radially slidable in said third annular groove and expanded to constantly retract against the outer surface of said piston, and a cam surface in said annular piston groove, extension of said piston to a predetermined maximum distance aligning said piston annular groove and said locking ring whereby the latter contracts into said piston groove and prevents further withdrawal of the piston, movement of said piston in a retracting direction initially resulting in said cam surface moving said locking ring outwardly within said third annular groove and simultaneously resulting in a discharge of pressure fluid from said fluid chamber through the radial passages in said valve seat surface in a reverse direction through said supply line.